June 30, 1931.  H. S. GOODMAN ET AL  1,812,002
CONVERTIBLE VEHICLE
Filed May 14, 1928   4 Sheets-Sheet 4
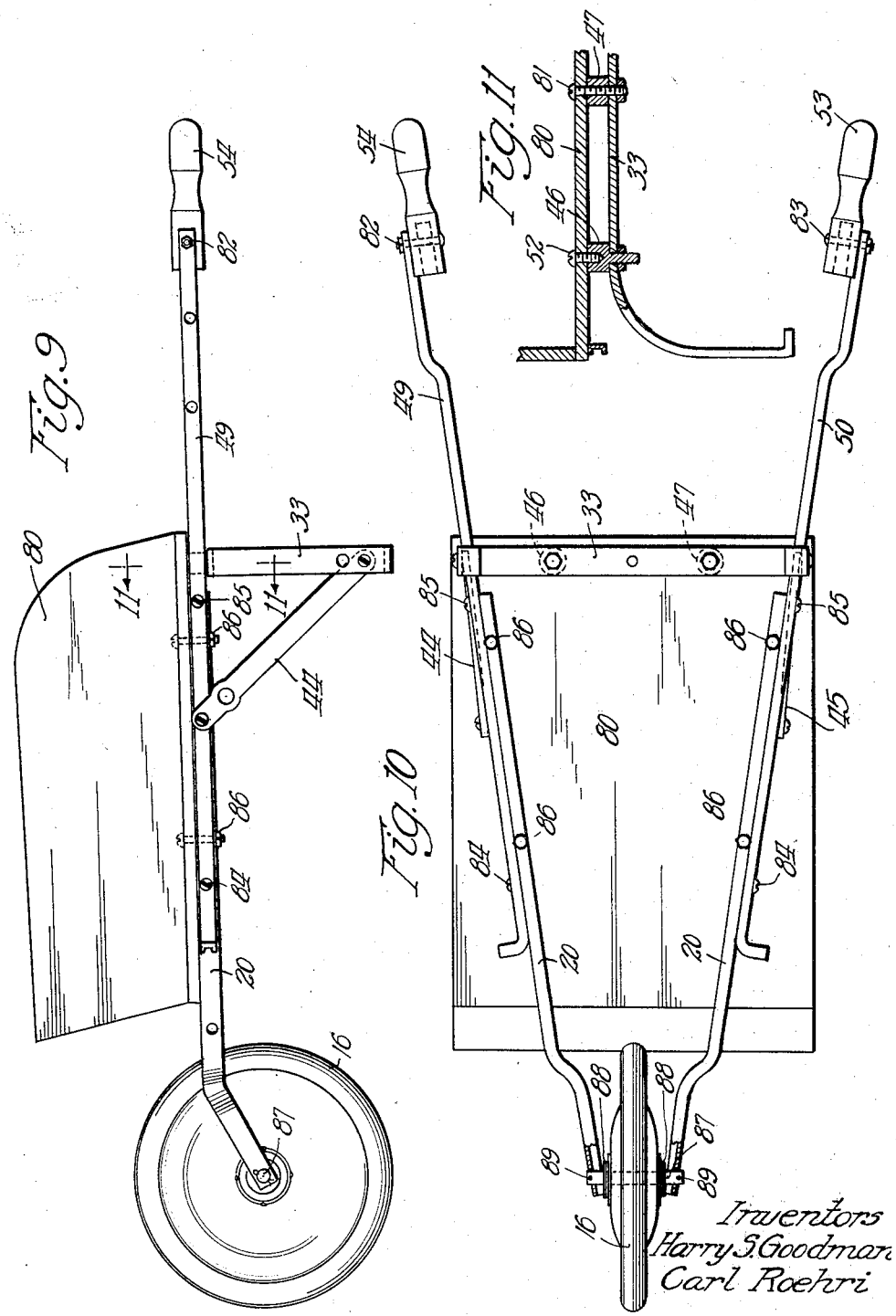

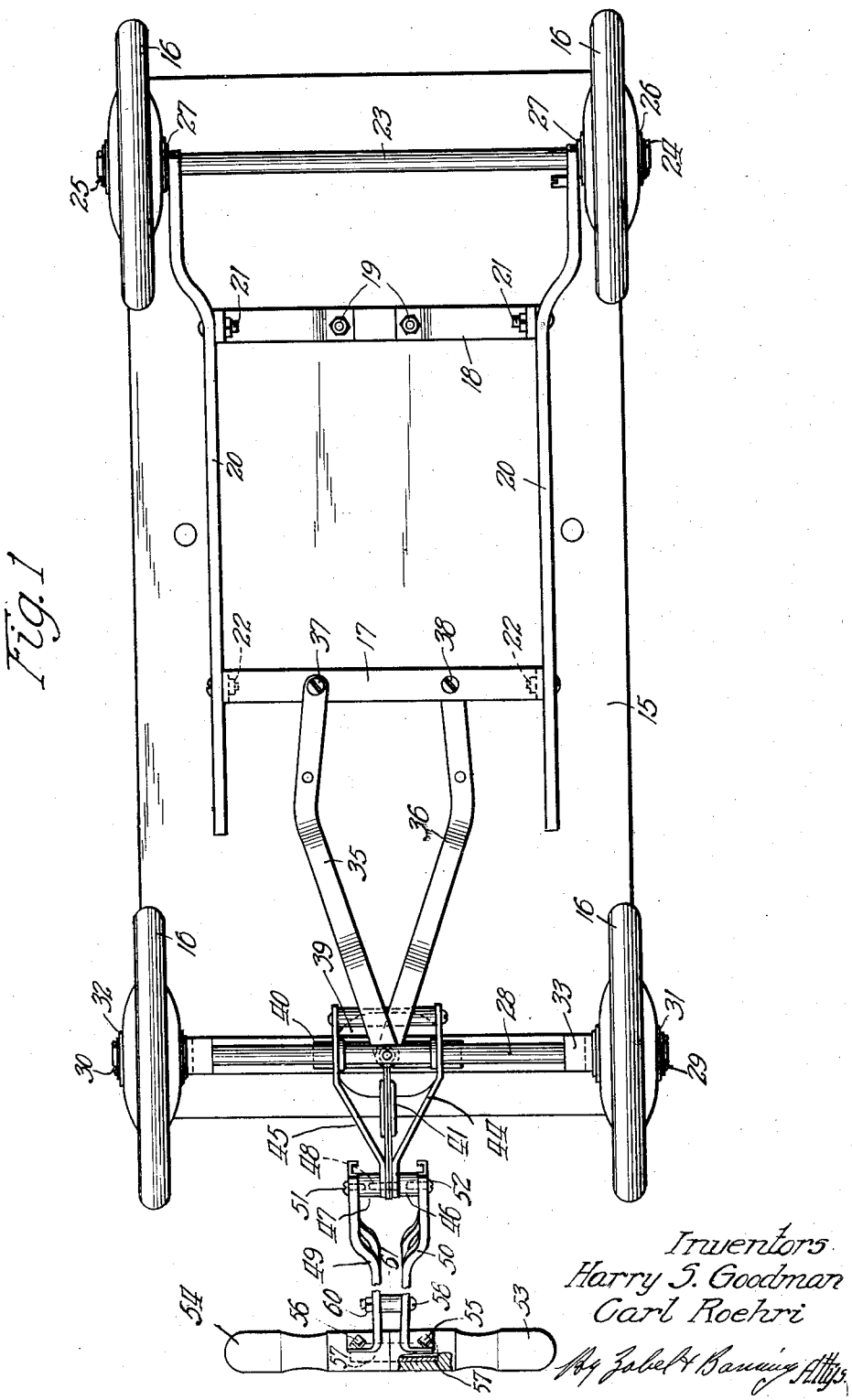

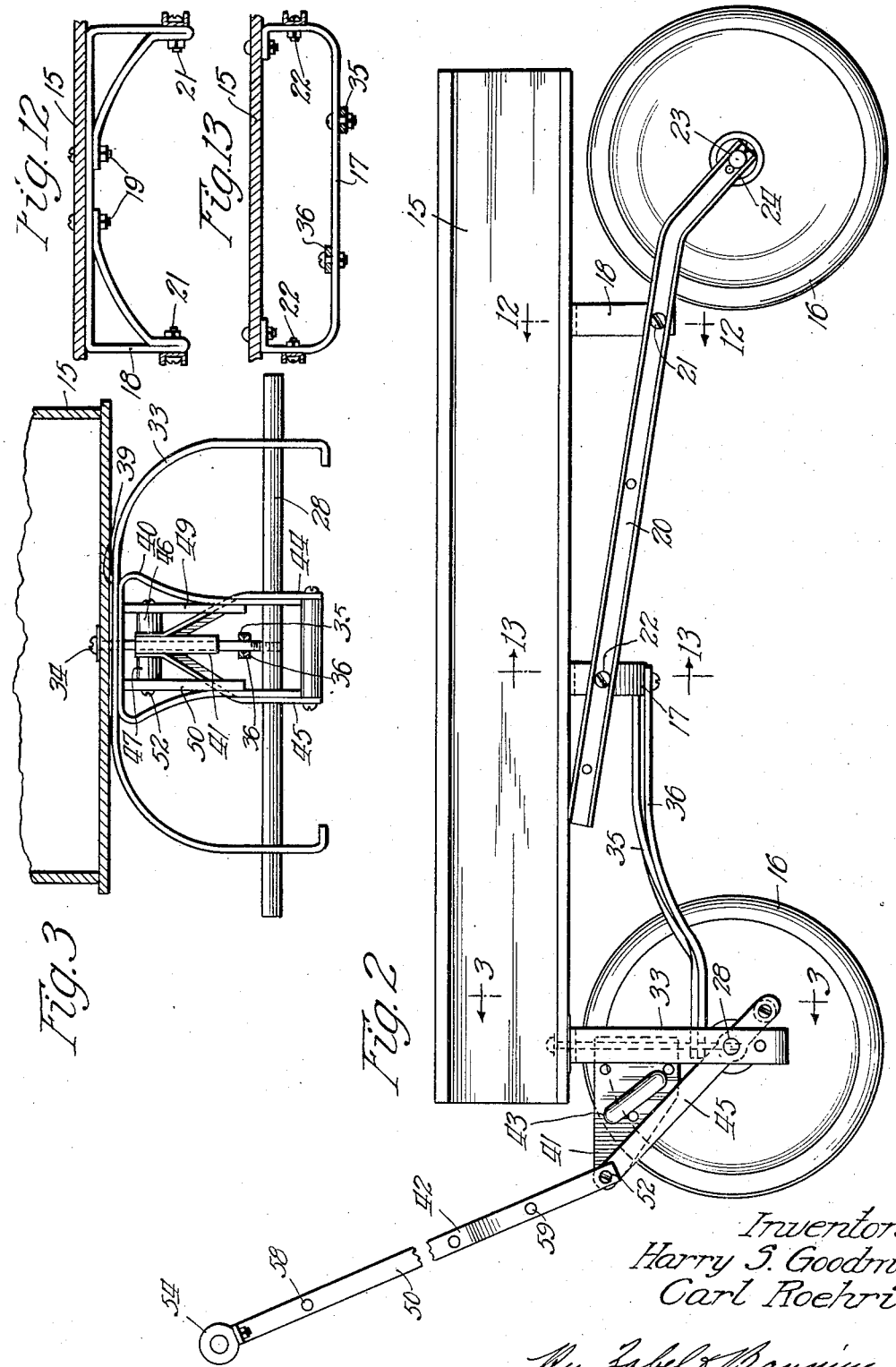

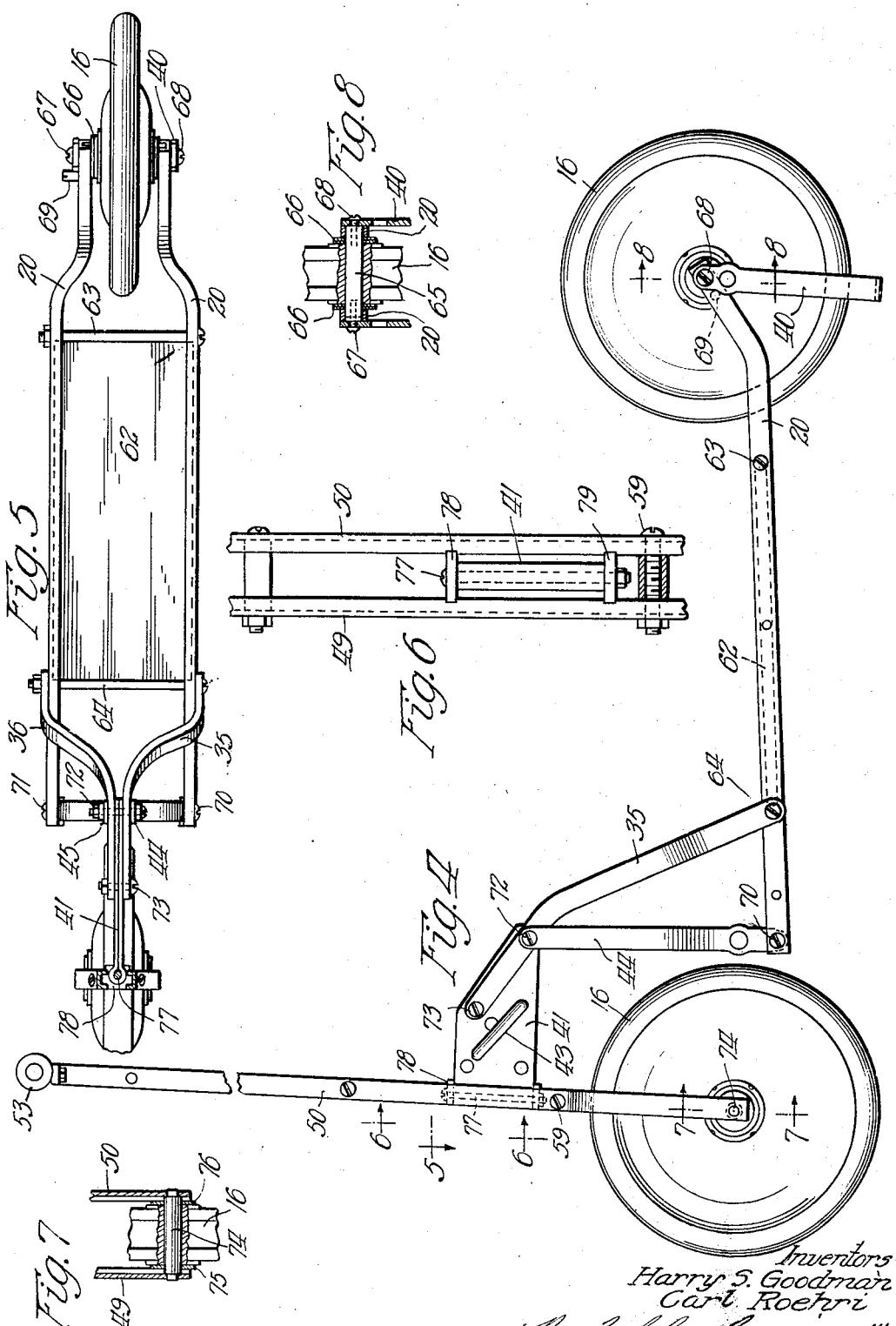

Patented June 30, 1931

1,812,002

UNITED STATES PATENT OFFICE

HARRY S. GOODMAN AND CARL ROEHRI, OF CHICAGO, ILLINOIS

CONVERTIBLE VEHICLE

Application filed May 14, 1928. Serial No. 277,614.

Our invention relates to convertible vehicles and more particularly to vehicles of the type which are designed for use by children. We have devised a certain plurality of parts, many of which may enter into the construction of two or more of the vehicles that may be constructed therefrom. The vehicles which are thus to be constructed are so designed that their parts are easily mountable and demountable whereby it is possible for the children themselves to perform the functions of making the necessary changes and transformations. In general, the parts which we have designed are capable of the production of three vehicles, respectively a four wheeled wagon, a two wheeled scooter and a one wheeled wheelbarrow.

We will describe our invention more in detail by referring to the accompanying drawings illustrating the same in which—

Fig. 1 is a bottom view of the wagon constructed in accordance with our invention;

Fig. 2 is a side view thereof, the two wheels nearest the observer being removed;

Fig. 3 is a sectional view on line 3—3 of Fig. 2;

Fig. 4 is a side view of the scooter;

Fig. 5 is a fragmentary top view thereof, the handle portion being omitted;

Fig. 6 is a fragmentary view showing certain parts in elevation along the line 6—6 of Fig. 4;

Fig. 7 is a fragmentary sectional view on line 7—7 of Fig. 4;

Fig. 8 is a fragmentary sectional view on line 8—8 of Fig. 4;

Fig. 9 is a side view of the wheelbarrow;

Fig. 10 is a bottom view of the wheelbarrow;

Fig. 11 is a fragmentary sectional view on line 11—11 of Fig. 9;

Fig. 12 is a fragmentary sectional view on line 12 of Fig. 2; and

Fig. 13 is a fragmentary sectional view on line 13 of Fig. 2;

Referring now particularly to Figs. 1, 2 and 3, we show a wagon constructed in accordance with our invention having the body portion 15 and the four wheels 16—16. Two U-shaped supports 17—18 are mounted on the bottom of the wagon, the support or strap 18 being held in place by the rivets 19—19. The strap 18 serves as a mounting for two channel iron side braces 20—20 which are held in place thereon by the bolts 21—21, the side braces 20 also being held in place by the strap 17 through the agency of the bolts 22—22. These side braces at their right end extremity support the rear wheels 16—16 through the agency of a round shaft or axle 23, suitable cotter pins 24—25 holding these parts together. Suitable washers 26 and 27 serve to decrease the frictional resistance of the turning wheels.

The front wheels 16—16 are mounted upon an axle 28, suitable cotter pins 29 and 30 through the interposition of washers 31 and 32 holding these wheels in place at the outer extremities of the axle. The inward movement of the wheels is restricted by the strap 33 suitably fastened to the wagon body by the kingbolt 34. Suitable washers are interposed between the wheels and the downwardly extending legs of the strap 33 as shown more clearly in Fig. 1. The strap 33 is designed to turn with the kingbolt 34 as an axle for purposes well understood. Two radius rods 35 and 36 are mounted to the strap 17 by means of the bolts 37 and 38 and at their front extremity encircle the kingbolt 34, thus providing a secure support for the said kingbolt. This kingbolt 34 screwthreadedly engages the axle 28 as shown more clearly in Fig. 3.

An oval-shaped friction plate 39 is interposed between the wagon body and the strap 33 to eliminate friction. A second strap 40 also forms part of this front wheel mounting structure and as shown more clearly in Figs. 1 and 3 encircles the kingbolt and axle 28. A draw bar structure 41 which is preferably a sheet metal stamping encircles the kingbolt 34 and then extends forwardly as shown more clearly in Fig. 2 to form a mounting for the handle 42. This structure 41 has punched out reinforcements 43 to enhance the stability thereof. Two arms 44 and 45 are arranged as shown in the illustrations in such manner that at their right hand extremities they encircle the axle 28 and at their left hand extremities are aligned with holes provided in the elements 41 and 42 so that the three parts may be secured together as more clearly shown in Figs. 1 and 2. These parts are secured together by means of spacers 46 and 47 which are preferably rounded and the spacer 46 has a projecting pin 48 which passes through holes provided in the elements 41, 44 and 45 and also engages a hole provided in the spacer 47, thus to align all of these parts together. The two arm portions 49 and 50 which form part of the handle structure 42 are then held in place exteriorly of these spacers by means of screws 51 and 52. The arms 49 and 50 are channel shaped as more clearly shown in Fig. 1. The outer extremities of the arms 49 and 50 are each secured to hand holds 53 and 54 by means of bolts 55 and 56. These two hand holds are alike and are aligned by a sleeve 57 which fits into a recess provided in each hand hold.

The two arms 49 and 50 are held tightly together by means of two bolts 58 and 59, one of said bolt structures being more clearly illustrated in Fig. 1, the same consisting of the bolt 58, the nut 60 and the spacer 61. The structure thus described forms a wagon consisting of parts which are easily assembled and disassembled and many of which are of use in connection with the construction of the two other vehicles heretofore referred to.

We will describe the scooter as shown in Figs. 4, 5, 6, 7 and 8. This scooter has the two wheels 16—16. These two wheels are united by a structure which will presently be described which includes a platform 62 as is customary in connection with vehicles of this kind. This platform is held in place between two side braces 20—20 which are the identical parts heretofore referred to in connection with the description of the wagon and which have the corresponding reference numerals.

These side braces are held together by two bolts 63 and 64, the platform being securely held in place between the two channel members 20—20 as shown. The forward extremity of these channel members is provided with means for supporting the front wheel 16 and the handle portion as will be presently explained and the rear ends of these side braces 20 are held together by the axle 65 as shown more clearly in Fig. 8.

A shaft section 65 is provided upon which the rear wheel 16 is mounted, the hub of this rear wheel having on its opposite sides washers 66. These washers are the same as the washers used in other parts of the devices but are given different reference numerals for purposes of clarity. The channel shaped side braces 20 are then mounted upon this shaft section 65 whereupon a stand 40 has its opposing legs also mounted in position as shown in Fig. 8. Two screws 67 and 68 then hold all of these various parts together on the shaft section 65. A stop pin 69 is provided upon one of the braces to limit the forward movement of this stand 40. This stand 40 is also one of the parts heretofore used in the construction of the wagon. The forward extremity of the side brace 20 is attached to two yoke members 44 and 45 heretofore used in connection with the wagon, these yoke members being bolted to the side frames by means of the bolts 70 and 71.

The upper extremities of these yoke members 44 are united by means of a bolt 72 which bolt at the same time secures certain other parts together. These other parts consist of the elements 35 and 36 and the structure 41. This structure 41, as will presently be explained, again serves to support the pivotal elements used in connection with the front wheel.

The elements 35 in addition to being held in position by the bolt 72 are also bolted to the structure 41 by the bolt 73. These elements 35 are further held in position upon the side braces 20 by means of the bolt 64. A very rigid structure is thus provided for the forward portion of the platform.

The front wheel structure consists of two channel iron elements 49 and 50, heretofore used in connection with the wagon, which support the front wheels 16 by virtue of the structure more clearly shown in Fig. 7. This structure includes a shaft section 74 upon which the wheel 16 is mounted, the two sides of the wheel hub being flanked by washers 75 and 76, the channel elements 49 and 50 then forming the outer portions of this structure as shown more clearly in Fig. 7. A suitable bolt structure 59, the same as that used in connection with the wagon, holds the lower portion of these elements 49 and 50 securely together.

The platform of the scooter is then held in place upon this front wheel structure by means of the element 41 which encircles a kingbolt 77 suitably held in place upon the elements 49 and 50 as shown in Fig. 6 by means of the blocks 78 and 79. These blocks 78 and 79 are held tightly in place because of the bolts which secure the parts 49 and 50 together. The parts 49 and 50 are at their upper extremity suitably provided with the hand holds 53 and 54 in a manner illustrated in connection with the wagon.

It will thus be seen that all of the parts used in connection with this scooter except the platform 62 and certain minor fastening elements are parts which form the running gear of the wagon heretofore explained.

We will now describe the third vehicle which we are enabled to construct from these parts, this being a wheelbarrow as shown in Figs. 9, 10 and 11. This wheelbarrow has the barrow portion 80 and has one wheel 16. This barrow portion is provided with a pair of legs which in this instance consist of the element 33 hereinbefore utilized in connection with the construction of the wagon. Suitable distance pieces 46 and 47 are interposed between this leg portion 43 and the bottom of the barrow 80, these distance pieces being the same as those utilized in connection with the construction of the wagon.

A suitable bolt 81 holds the distance piece 47 in position. The handle portion of the wheelbarrow consists of the two elements 49 and 50 heretofore used in connection with the wagon. The hand holds 53 and 54 being in this instance separated so that one may be attached to each of the free extremities of the arms 49 and 50. Suitable bolts 82 and 83 secure these hand holds in position. Suitable side frames 20 heretofore used in connection with the wagon and scooter are mounted to extend forwardly of the elements 49 and 50 and in alignment therewith, the same being bolted to the elements 49 and 50 by means of the bolts 84 and 85. The elements 20 are also bolted to the body of the wheelbarrow by means of the bolts 86. The wheel 16 is mounted upon a shaft section 87 being flanked on its sides by washers 88 so that the elements 20 may hold all of these parts together upon a shaft section 87.

Braces 44 and 45 extend between the parts 33, 49 and 50 as shown more clearly in Fig. 9.

Suitable cotter pins 89 are provided to secure the elements in final position. It will thus be seen that in the construction of this wheelbarrow that we again utilize parts which have heretofore been used in the construction of the wagon. The interchangeability of these parts will thus be readily apparent.

From what has been heretofore described, the nature of our invention will be readily clear to those skilled in the art and it will also be apparent that many modifications may be made without departing from the spirit of our said invention.

Having, however, thus described one form which our invention may take, what we claim as new and desire to secure by Letters Patent of the United States is:

1. A convertible chassis for use in a two wheeled and four wheeled vehicle consisting of wheels, front and rear axles, a pair of side frames secured to the rear axle, handle means, a pair of radius rods, and means for connecting the parts to accommodate any one of a plurality of vehicle bodies with the frames either below or above the axis of rotation of the supporting wheels, said connecting means including a draw bar structure and means for pivoting said structure on a vertical axis to either the handle or the radius rods.

2. A convertible chassis for use in a two wheeled and four wheeled vehicle consisting of wheels, front and rear axles, a pair of side frames secured to the rear axle, handle means, a pair of radius rods, and means for connecting the parts to accommodate any one of a plurality of vehicle bodies according to their requirement of two or four wheels, said means connecting the wheels so that at least one may pivot on a vertical axis for steering the vehicle, said connecting means including a draw bar structure and means for pivoting said structure on a vertical axis to either the handle or the radius rods.

3. A convertible chassis for use in connection with two or four wheeled vehicles comprising a pair of elongated side frame members having at one end an axle for mounting the wheel means, said members being spaced apart on said axle, means adjacent the other end of said members spacing them apart, radius rods attached to said means, a front axle, means pivotally connecting said axle to the front ends of said radius rods, and handle means supported on said connecting means.

4. A convertible chassis for use in connection with two or four wheeled vehicles comprising a pair of elongated side frame members having at one end an axle for mounting the wheel means, said members being spaced apart on said axle, means adjacent the other end of said members spacing them apart, radius rods attached to said means, a front axle, means pivotally connecting said axle to the front ends of said radius rods, and handle means supported on said connecting means, said handle means comprising a pair of members each having a hand hold, and means interlocking said hand holds.

5. A convertible chassis for use in a two or four wheeled vehicle comprising a pair of side frames, an axle secured by said side frames at one end thereof, a pair of handle members, means including hand holds on said members for securing them together, said members being bowed apart at one end, means including a pair of radius rods and a draw bar connecting said side frames to said handle, and a front axle supporting said draw bar.

6. A convertible chassis for use in a two or four wheeled vehicle comprising a pair of side frames, an axle secured by said side frames at one end thereof, a pair of handle members, means including hand holds on said members for securing them together, said members being bowed apart at one end, means including a pair of radius rods and a draw bar connecting said side frames to said handle, a front axle and means passing through said draw bar serving as a pivotal connection between said front axle and radius rods.

In witness whereof, we hereunto subscribe our names this 20th day of April, A. D., 1928.

CARL ROEHRI.
HARRY S. GOODMAN.